United States Patent
Cong et al.

(10) Patent No.: US 10,814,598 B2
(45) Date of Patent: *Oct. 27, 2020

(54) METHOD FOR TRANSFERRING TWO-DIMENSIONAL NANOMATERIALS

(71) Applicants: Tsinghua University, Beijing (CN); HON HAI PRECISION INDUSTRY CO., LTD., New Taipei (TW)

(72) Inventors: Lin Cong, Beijing (CN); Wei Zhao, Beijing (CN); Jin Zhang, Beijing (CN); Yu-Chien Tsai, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 49 days.

This patent is subject to a terminal disclaimer.

(21) Appl. No.: 16/252,703

(22) Filed: Jan. 20, 2019

(65) Prior Publication Data

US 2019/0232632 A1 Aug. 1, 2019

(30) Foreign Application Priority Data

Jan. 27, 2018 (CN) .......................... 2018 1 0080249

(51) Int. Cl.
*B32B 37/00* (2006.01)
*B32B 3/26* (2006.01)
(Continued)

(52) U.S. Cl.
CPC ............ *B32B 37/025* (2013.01); *B32B 3/266* (2013.01); *B32B 7/12* (2013.01); *B32B 15/14* (2013.01); *B32B 2262/106* (2013.01)

(58) Field of Classification Search
CPC combination set(s) only.
See application file for complete search history.

(56) References Cited

U.S. PATENT DOCUMENTS 8,173,525 B2 * 5/2012 Graham, Jr. ........... B82Y 40/00
438/496
9,630,849 B2 * 4/2017 Wei ........................ C01B 32/168
(Continued)

FOREIGN PATENT DOCUMENTS

CN 102315058 1/2012
CN 102737935 10/2012
(Continued)

*Primary Examiner* — Sing P Chan
(74) *Attorney, Agent, or Firm* — ScienBiziP, P.C.

(57) ABSTRACT

The present invention relates to a method for transferring two-dimensional nanomaterials. The method comprises: (S1) providing a first substrate with a two-dimensional nanomaterial layer on a surface of the first substrate and a carbon nanotube composite film comprising a carbon nanotube film structure and a nanomaterial layer stacked with each other; (S2) covering the two-dimensional nanomaterial layer with the carbon nanotube composite film, wherein the carbon nanotube film structure of the carbon nanotube composite film is in contact with the two-dimensional nanomaterial layer; (S3) obtaining a composite structure comprising the two-dimensional nanomaterial layer and the carbon nanotube composite film by removing the first substrate with a corrosion solution; (S4) placing the composite structure on a surface of a cleaning solution for cleaning; (S5) picking up the composite structure from the cleaning solution by contacting the target substrate with the two-dimensional nanomaterial layer; and (S6) removing the carbon nanotube composite film.

19 Claims, 8 Drawing Sheets

(51) Int. Cl.
*B32B 7/12* (2006.01)
*B32B 15/14* (2006.01)
*B82Y 40/00* (2011.01)
*B82Y 30/00* (2011.01)
*B82B 3/00* (2006.01)

(56) References Cited

U.S. PATENT DOCUMENTS

| | | | | |
|---|---|---|---|---|
| 9,650,253 | B2* | 5/2017 | Wei | B82Y 40/00 |
| 9,695,045 | B2* | 7/2017 | Wei | B82Y 40/00 |
| 9,776,871 | B2* | 10/2017 | Wei | C01B 32/168 |
| 9,862,170 | B2* | 1/2018 | Wei | B32B 37/025 |
| 2008/0193678 | A1* | 8/2008 | Han | B82Y 40/00 |
| | | | | 427/598 |
| 2008/0283269 | A1* | 11/2008 | Graham, Jr. | B82Y 10/00 |
| | | | | 174/98 |
| 2010/0009165 | A1* | 1/2010 | Patel | B82Y 30/00 |
| | | | | 428/323 |
| 2010/0025222 | A1* | 2/2010 | Iijima | C01B 32/168 |
| | | | | 204/157.6 |
| 2012/0006784 | A1 | 1/2012 | Lin et al. | |
| 2012/0258275 | A1 | 10/2012 | Maeno | |
| 2012/0261588 | A1 | 10/2012 | Wei et al. | |
| 2012/0298289 | A1 | 11/2012 | Jiang et al. | |
| 2013/0264193 | A1 | 10/2013 | Lin et al. | |
| 2016/0042912 | A1 | 2/2016 | Adiga et al. | |
| 2019/0232630 | A1* | 8/2019 | Cong | B32B 3/266 |
| 2019/0232631 | A1* | 8/2019 | Cong | B81C 1/00373 |
| 2019/0232632 | A1* | 8/2019 | Cong | B32B 7/12 |

FOREIGN PATENT DOCUMENTS

| | | |
|---|---|---|
| CN | 103359723 | 10/2013 |
| CN | 103746072 | 4/2014 |
| CN | 206163454 | 5/2017 |
| CN | 206163454 U | 5/2017 |
| JP | 2011-132074 | 7/2011 |
| TW | I427000 | 2/2014 |
| TW | I520901 | 2/2016 |
| WO | 2014/064057 | 5/2014 |

* cited by examiner

METHOD FOR TRANSFERRING TWO-DIMENSIONAL NANOMATERIALS

CROSS-REFERENCE TO RELATED APPLICATIONS

This application claims all benefits accruing under 35 U.S.C. § 119 from China Patent Application No. 201810080249.6, filed on Jan. 27, 2018, in the China National Intellectual Property Administration, the contents of which are hereby incorporated by reference. This application is related to applications entitled, "METHOD FOR TRANSFERRING TWO-DIMENSIONAL NANOMATERIALS", filed Jan. 20, 2019 (Ser. No. 16/252,700), "METHOD FOR PREPARING SUSPENDED TWO-DIMENSIONAL NANOMATERIALS", filed Jan. 20, 2019 (Ser. No. 16/252,701), "TRANSMISSION ELECTRON MICROSCOPE MICRO-GRID AND METHOD FOR MAKING THE SAME", filed Jan. 20, 2019 (Ser. No. 16/252,702).

FIELD

The present disclosure relates to a method for transferring two-dimensional nanomaterials, specifically, relates to a method for transferring two-dimensional nanomaterials with a carbon nanotube composite film.

BACKGROUND

Two-dimensional nanomaterials, such as graphene, boron nitride, molybdenum disulfide, etc., have become a hotspot in chemistry, materials science, and physics because of their excellent properties. Large-scale preparation and transfer are still a research focus of the two-dimensional nanomaterials. At present, the most common method for transferring two-dimensional nanomaterials from a substrate such as a copper to a target substrate comprises: covering the two-dimensional nanomaterials with a transfer medium such as polymethylmethacrylate (PMMA) or a thermal release tape; etching the copper substrate; transferring the two-dimensional nanomaterials and the transfer medium to a target substrate; removing the transfer medium. However, in practice, the PMMA or thermal release tape placed is not easily removed, and residual organic binders would seriously pollute two-dimensional nanomaterials, which can affect performance characterization and device preparation.

In order to solve the problems above, a glueless transfer method is proposed. A target substrate is directly contacted with the two-dimensional nanomaterials on a surface of a substrate without using a transfer medium, and then is thermally imprinted. Then, the substrate is removed by etching, and thereby the two-dimensional nanomaterial is transferred on a surface of the target substrate. However, in this way, the two-dimensional nanomaterials have more wrinkles after transfer and are easily damaged during the transfer process.

What is needed, therefore, is to provide a transfer method for two-dimensional nanomaterials, to solve the problems discussed above.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1:
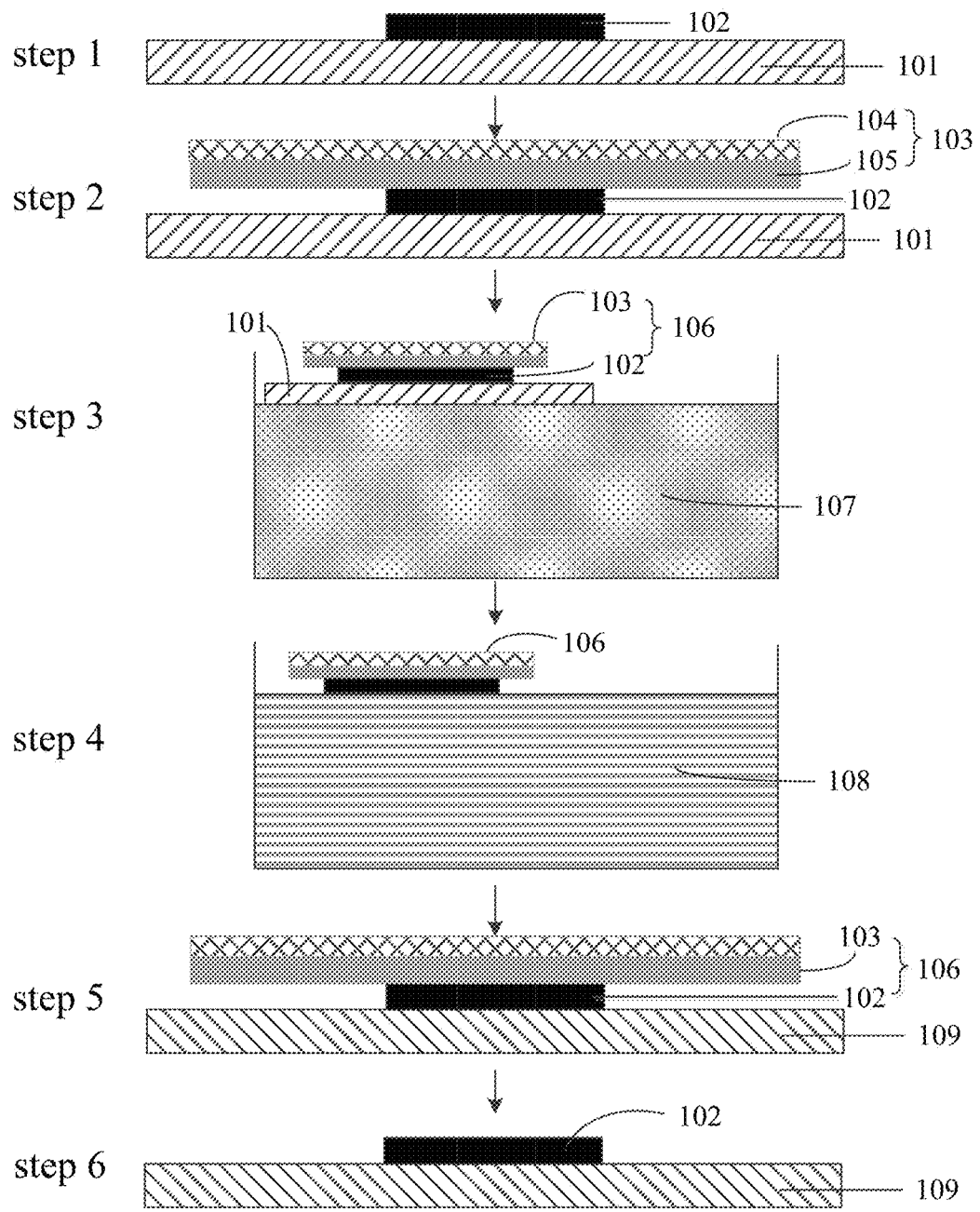
FIG. 1 shows a flow chart of a method for transferring two-dimensional nanomaterials according to one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

Referring to FIG. 1, a method for transferring two-dimensional nanomaterials according to one embodiment comprises the following steps:

S1, providing a first substrate 101 with a two-dimensional nanomaterial layer 102 located on a surface of the first substrate 101, and a carbon nanotube composite film 103 comprising a carbon nanotube film structure 104 and a nanomaterial layer 105 stacked with each other;

S2, covering the two-dimensional nanomaterial layer 102 with the carbon nanotube composite film 103, wherein the carbon nanotube film structure 104 of the carbon nanotube composite film 103 is in contact with two-dimensional nanomaterial layer 102;

S3, obtaining a composite structure 106 comprising the two-dimensional nanomaterial layer 102 and the carbon nanotube composite film 103 by removing the first substrate 101 with a corrosion solution 107 to;

S4, cleaning the composite structure 106 by placing the composite structure 106 on a surface of a cleaning solution 108;

S5, picking up the composite structure 106 from the cleaning solution 108 with a target substrate 109 by contacting the target substrate 109 with the two-dimensional nanomaterial layer 102 of the composite structure 106;

S6, removing the carbon nanotube composite film 103 from the composite structure 106.

The step S1-S6 are described in detail as followings.

In the step S1, a first substrate 101 is provided and a two-dimensional nanomaterial layer 102 is placed on a surface of the first substrate 101.

The first substrate 101 serves as a support for the two-dimensional nanomaterial. The first substrate 101 is chemically stable and can be removed by chemical methods or physical methods. A material of the first substrate 101 can be a semiconductor material or a metal material according to different applications. In one embodiment, the first substrate 101 can be a silicon wafer, a copper foil, a nickel foil or a copper-nickel alloy.

The two-dimensional nanomaterial layer 102 can be formed on the surface of the first substrate 101 via a chemical vapor deposition method. A material of the two-dimensional nanomaterial layer 102 can be a graphene, a boron nitride, a molybdenum sulfide, or other two-dimensional materials. A layer number of the two-dimensional nanomaterial layer 102 is not limited. The layer number of the two-dimensional nanomaterial layer 102 can be one layer, two layers or multiple layers.

In one embodiment, the first substrate 101 is a copper foil, and the two-dimensional nanomaterial layer 102 is a single-layer graphene directly grown on a surface of the copper foil. In another embodiment, the first substrate 101 is a silicon substrate, and the two-dimensional nanomaterial layer 102 is a single-layer molybdenum sulfide grown on a surface of the silicon substrate.

In the step S2, a carbon nanotube composite film 103 is provided. The carbon nanotube composite film 103 comprises a carbon nanotube film structure 104 and a nanomaterial layer 105. The two-dimensional nanomaterial layer 102 is covered by the carbon nanotube composite film 103, and the carbon nanotube film structure 104 of the carbon nanotube composite film 103 is in contact with the two-dimensional nanomaterial layer 102.

The carbon nanotube film structure 104 is a free-standing structure. The carbon nanotube film structure 104 consists of at least two carbon nanotube films stacked with each other. The carbon nanotube film comprises a plurality of carbon nanotubes joined end-to-end by van der Waals force therebetween and arranged approximately along a same direction. An extending direction of each of the carbon nanotubes is substantially parallel to a surface of the carbon nanotube film. An angle between the extending directions of the carbon nanotubes in adjacent carbon nanotube films can range from about 0 degrees to about 90 degrees ($0° \leq \alpha \leq 90°$).

The carbon nanotube film structure 104 defines a plurality of apertures. Understandably, the more layers of the carbon nanotube film, the smaller the diameter of the aperture and the less the number of the apertures. In one embodiment, the carbon nanotube film structure 104 consists of two carbon nanotube films stacked together at an angle of about 90 degrees, and the two adjacent carbon nanotube films are substantially perpendicular to each other.

The carbon nanotube film can be drawn directly from a carbon nanotube array, which comprises the following steps:

S21, providing a super-aligned carbon nanotube array grown on a surface of a growth substrate.

The carbon nanotube array can be formed by a chemical vapor deposition (CVD) method. The carbon nanotube array comprises a plurality of carbon nanotubes parallel to each other and approximately perpendicular to the growth substrate. The carbon nanotube array contains no impurities substantially such as amorphous carbon or residual catalyst metal particles, and is suitable for drawing a carbon nanotube film therefrom.

S22, pulling/drawing out a carbon nanotube film from the carbon nanotube array with a tool.

The step S22 comprises the following steps:

S221, selecting a carbon nanotube segment having a predetermined width from the carbon nanotube array; and S222, pulling the carbon nanotube segment at an even and uniform speed to obtain the uniform drawn carbon nanotube film.

In step S221, the carbon nanotube segment having a predetermined width can be selected by using an adhesive tape having a predetermined width to contact the carbon nanotube array. The carbon nanotube segment comprises a plurality of carbon nanotubes parallel to each other. In step S222, the pulling direction is substantially perpendicular to a growth direction of the carbon nanotube array.

Figure 2:
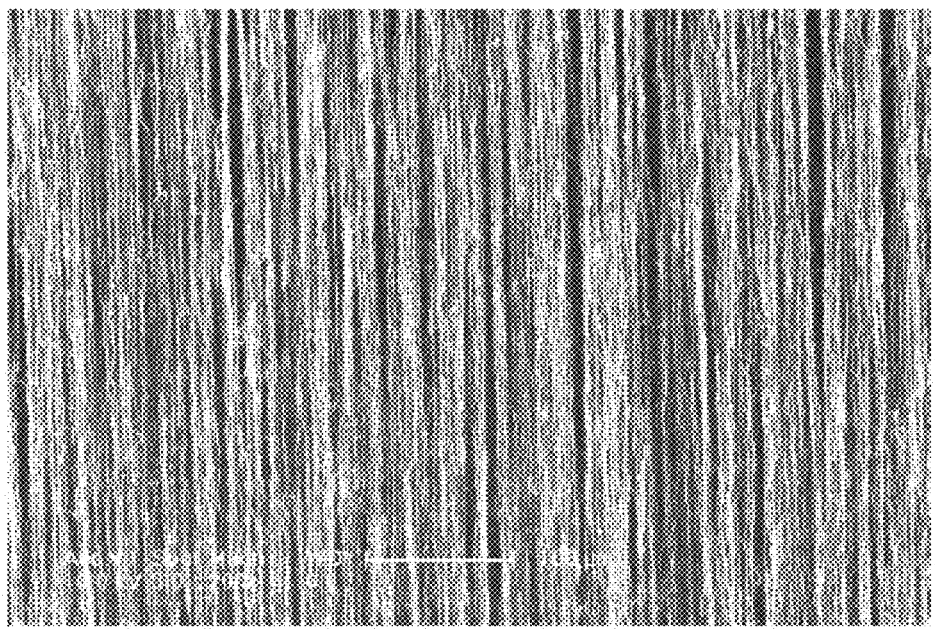
FIG. 2 shows a Scanning Electron Microscope (SEM) image of a carbon nanotube film.

More specifically, during the pulling process, as the initial carbon nanotube segment is drawn out, other carbon nanotube segments are subsequently drawn out end-to-end due to the van der Waals force between the ends of the adjacent segments. This process of drawing ensures that a continuous, uniform carbon nanotube film having a predetermined width can be formed. Referring to FIG. 2, the carbon nanotubes in the carbon nanotube film are joined end-to-end by van der Waals force therebetween to form a free-standing film. 'Free-standing' herein is defined so that the carbon nanotube film does not need support from a substrate and can sustain its own weight when it is hoisted by a portion thereof without tearing. The carbon nanotube film comprises a plurality of carbon nanotubes joined end-to-end by van der Waals force therebetween and arranged approximately along a same direction. The plurality of carbon nanotubes are arranged approximately along the drawing direction.

Figure 3:
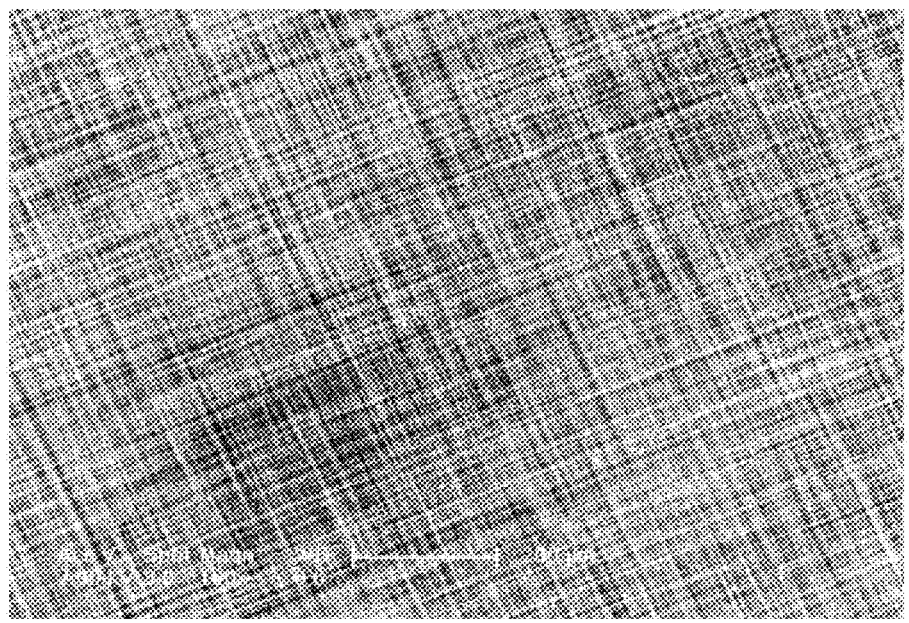
FIG. 3 shows a SEM image of a carbon nanotube film structure comprising a plurality of stacked carbon nanotube films.

Referring to FIG. 3, then, at least two carbon nanotube films are stacked with each other along different directions, and the carbon nanotube film structure 104 is formed. The process above specifically comprises: providing a frame and securing a first carbon nanotube film to the frame along a first direction, wherein one or more edges of the carbon nanotube film are attached to the frame and other parts of the carbon nanotube film are suspended over the frame; placing a second carbon nanotube film on a surface of the first carbon nanotube film along a second direction. More two carbon nanotube films can be stacked with each other on the frame by repeating the above process. The carbon nanotube films can be respectively arranged along different directions, and can also be arranged along two directions.

The carbon nanotube film has an extremely large specific surface area, and is very self-adhesive, so adjacent carbon nanotube films can be combined with the van der Waals force therebetween to form the stable carbon nanotube film structure 104.

Figure 4:
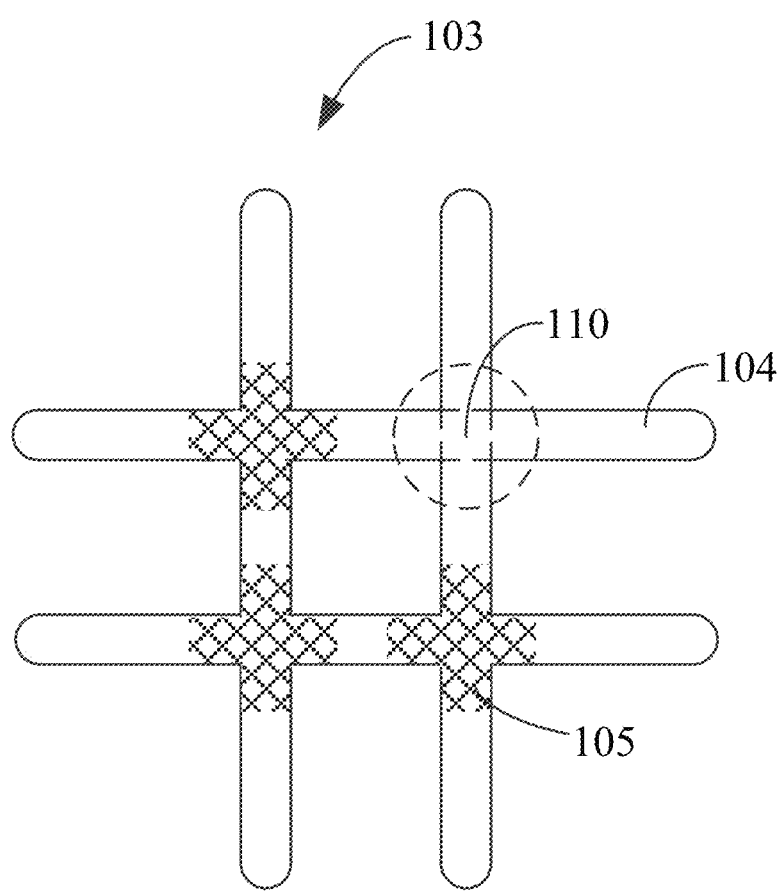
FIG. 4 shows a schematic view of a carbon nanotube composite film according to one embodiment.

The carbon nanotube film structure 104 comprises two opposite surfaces. The nanomaterial layer 105 is formed on one surface of the carbon nanotube film structure 104. The nanomaterial layer 105 can be a continuous structure, that is, the nanomaterial layer 105 is continuously formed on a surface of each carbon nanotube in the carbon nanotube film structure 104 to form a continuous layer structure. The nanomaterial layer 105 can be a discontinuous structure, that is, the nanomaterial layer 105 is formed at an intersection 110 of adjacent carbon nanotubes in the carbon nanotube film structure 104. Referring to FIG. 4, regardless of whether the nanomaterial layer 105 is a continuous structure or a discontinuous structure, the nanomaterial layer 105 at the intersection 110 of adjacent carbon nanotubes is continuous and is an integrated structure. Adjacent carbon nanotubes can be further bond together by the nanomaterial layer 105, thereby further improving a structural stability of the carbon nanotube film structure 104. The carbon nanotube composite film 103 is a stable integrated structure.

A material of the nanomaterial layer 105 is chemically stabile. The material of the nanomaterial layer 105 can be inert metal, metal oxide, semiconductor oxide or nitride. For example, the material of the nanomaterial layer 105 can be gold, platinum, titanium, aluminum oxide, silicon dioxide, boron nitride, and silicon nitride. In one embodiment, the material of nanomaterial layer 105 is gold. A thickness of the nanomaterial layer 105 ranges from about 1 nanometer to 500 nanometers. In one embodiment, the thickness of the nanomaterial layer 105 ranges from about 10 nanometers to 100 nanometers. In another embodiment, the thickness of the nanomaterial layer is 30 nanometers. The nanomaterial layer 105 can be formed on the surface of the carbon nanotube film structure 10 by a chemical method such as the chemical vapor deposition method or a physical method such as evaporation or sputtering. In one embodiment, before the nanomaterial layer 105 is formed on the surface of the carbon nanotube film structure 104, the carbon nanotube film structure 104 is infiltrated with an organic solvent. Thus, the two adjacent carbon nanotube films of the carbon nanotube film structure 104 are more tightly bonded, making the nanomaterial layer 105 at the intersection of two adjacent carbon nanotubes easier to form an integral structure.

Figure 5:
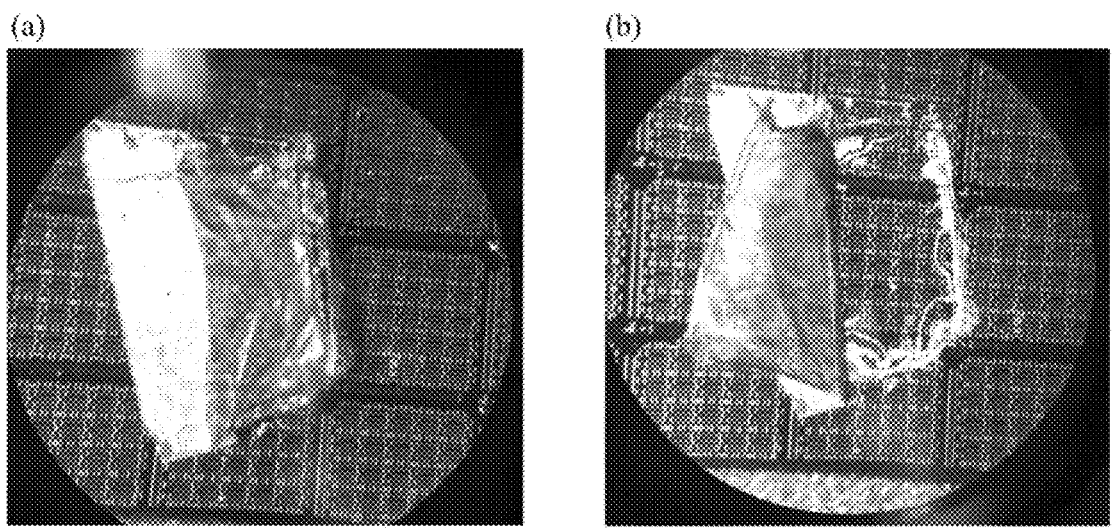
FIG. 5 shows Stereoscopic Microscope images of a carbon nanotube composite film according to one embodiment.

Since the nanomaterial layer 105 is thin and does not fill up the apertures of the carbon nanotube film structure 104 completely, the carbon nanotube composite film 103 porous and comprises micropores. The micropores are dispersed uniformly. The micropores extend through the carbon nanotube composite film 103 along the thickness direction thereof. Therefore the carbon nanotube composite film 103 is light transmitting and transparent. FIG. 5(a) shows a Stereoscopic Microscope image of a carbon nanotube composite film. The carbon nanotube composite film is placed on a surface of a wafer and covers a plurality of gold electrodes on the surface of the wafer in FIG. 5(a). Referring to FIG. 5(a), the carbon nanotube composite film is transparent and the plurality of gold electrodes can be clearly observed.

The carbon nanotube composite film 103 is placed on a surface of the two-dimensional nanomaterial layer 102 away from the first substrate 101. The carbon nanotube composite film 103 can adhere to the two-dimensional nanomaterial layer 102 firmly by van der Waals force to form a first substrate/two-dimensional nanomaterial layer/carbon nanotube composite film composite structure.

Step S2 can further comprise an optional step of treating the carbon nanotube composite film 103 on the two-dimensional nanomaterial layer 102 of the first substrate 101 with an organic solvent. The organic solvent can be volatile at room temperature and can be ethanol, methanol, acetone, dichloroethane, chloroform, or any combination thereof. The step of treating the carbon nanotube composite film 103 with the organic solvent comprises: dropping the organic solvent on a surface of the carbon nanotube composite film 103 uniformly and infiltrating the whole carbon nanotube structure 103 with the organic solvent, or, alternatively, immersing the entire carbon nanotube composite film 103 on the two-dimensional nanomaterial layer 102 of the first substrate 101 into a container containing the organic solvent.

The organic solvent can be evaporated from the surface of the carbon nanotube composite film 103. Thereby micropores between adjacent carbon nanotubes in the carbon nanotube composite film 103 can be enlarged, and the carbon nanotube composite film 103 can adhere to the two-dimensional nanomaterial layer 102 more firmly by a surface tension of the solvent, in addition to the self-adhering van der Waals force.

In the step S3, the first substrate 101 is removed with a corrosion solution 107, and thus a composite structure 106 comprising the two-dimensional nanomaterial layer 102 and the carbon nanotube composite film 103 can be obtained.

The first substrate/two-dimensional nanomaterial layer/carbon nanotube composite film composite structure is placed on a surface of a corrosion solution 107 filled in a container. The first substrate 101 is in contact with the corrosion solution 107. The corrosion solution 107 can react with the first substrate 101 and will not erode the two-dimensional nanomaterial layer 102 and the carbon nanotube film composite structure 103. Thus, after reacting with the corrosion solution 107 for a period of time, the first substrate 101 can be removed.

Different corrosion solution 107 can be selected according to the material of the first substrate 101. The corrosion solution 107 can be an acid solution, an alkali solution, or a salt solution. For example, the corrosion solution 107 can be a ferric chloride solution, an ammonium persulfate solution, or a potassium hydroxide solution. A corroding time required for the first substrate 101 depends on a size and a thickness of the first substrate 101 and a concentration and a type of the corrosion solution 107. In one embodiment, the corrosion solution 107 is the ammonium persulfate solution, the concentration of the ammonium persulfate solution is 0.1 mol/L, and the corroding time is about 2 hours to 3 hours.

During the corroding process, the carbon nanotube composite film 103 can float on the surface of the corrosion solution 107 due to its own hydrophobicity. The two-dimensional nanomaterial layer 102 can adhere to the surface of the carbon nanotube composite film 103 tightly via the van der Waals force therebetween. Moreover, as a free-standing structure, the carbon nanotube composite film 103 can act as a carrier for supporting the two-dimensional nanomaterial layer 102, and the carbon nanotube composite film 103 can also prevent a continuous integrated structure of the two-dimensional nanomaterial layer 102 from disintegrating.

In the step S4, the composite structure 106 comprising the two-dimensional nanomaterial layer 102 and the carbon nanotube composite film 103 is placed on a surface of a cleaning solution 108 for cleaning.

In the corroding process of the step S3, solid impurities can be formed on a surface of the two-dimensional nanomaterial layer 102. The composite structure 106 can be further cleaned by a cleaning solution 108 to remove the solid impurities. In one embodiment, the cleaning process comprises the followings steps:

S41, picking up the composite structure 106 from the corrosion solution 107 with a slide glass;

S42, transferring the composite structure 106 to the surface of the cleaning solution 108 with the slide glass and rinsing off the solid impurities.

The steps above can be repeated many times until the solid impurities are removed completely. The cleaning solution 108 can be an acid solution or an ultra-pure water.

In the step S5, a target substrate 109 is provided and the composite structure 106 comprising the two-dimensional nanomaterial layer 102 and the carbon nanotube composite film 103 is picked up from the cleaning solution 108 with the target substrate 109, wherein the target substrate 109 is in contact with the two-dimensional nanomaterial layer 102 of the composite structure 106.

The target substrate 109 serves as a support for the two-dimensional nanomaterial layer 102. A material of the target substrate 109 is not limited. The material of the target substrate 109 can be a metal material such as gold, aluminum, nickel, chromium, copper, a semiconductor material such as silicon, gallium nitride, gallium arsenide, or an insulating material such as silicon dioxide, silicon nitride. A length, a width and a thickness of the target substrate 109 are not limited and can be adjusted according to applications. A surface of the target substrate 109 can be a flat surface or a curved surface.

The target substrate 109 can define no holes. Alternatively, the target substrate 109 can define at least one hole. The hole can be a through hole or a blind hole. The hole can be formed by etching the target substrate 109. A diameter of the hole ranges from about 0.1 microns to about 100 microns, and in one embodiment, the diameter of the hole ranges from about 0.5 microns to about 50 microns. A cross-sectional shape of the hole can be a circle, a quadrangle, a hexagon, an octagon or an ellipse etc. When the target substrate 109 comprises a plurality of through holes, an arrangement of the plurality of holes on the target substrate 109 are not limited. A distance between adjacent through holes can be equal or unequal. The plurality of the holes can be evenly distributed in the target substrate 109. In one embodiment, the target substrate 109 is a porous silicon nitride substrate, a surface of the porous silicon nitride substrate is a flat surface. The porous silicon nitride substrate comprises a plurality of through holes, and a diameter of each through hole is about 2 micrometers.

The process of picking up the composite structure 106 from the cleaning solution 108 with the target substrate 109 comprises: S51, inserting the target substrate 109 into the cleaning solution; S52, lifting the target substrate 109 slowly to pick up the composite structure 106.

Figure 6:
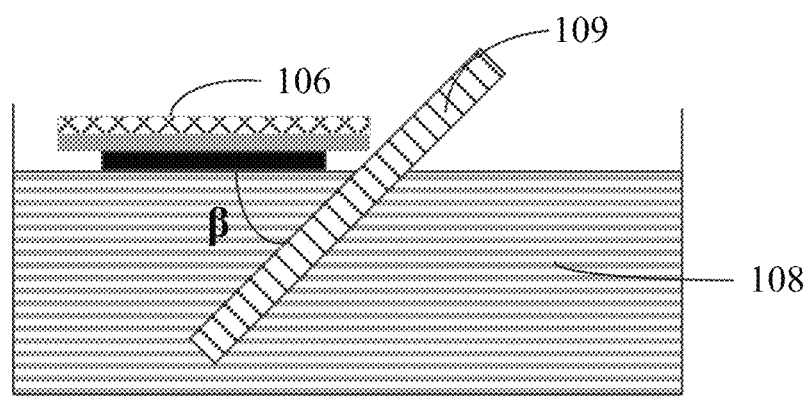
FIG. 6 shows a sketch of inserting a target substrate into a cleaning solution to picking up a composite structure comprising a two-dimensional nanomaterial layer and a carbon nanotube film structure.

Referring to FIG. 6, in the step S51, a manner of inserting the target substrate 109 into the cleaning solution 108 is not limited. In one embodiment, the target substrate 109 can be obliquely or vertically inserted into the cleaning solution 108 along one edge of the composite structure 106, and a surface of the target substrate 109 is in contact with the edge of the composite structure 106. 'Obliquely' implies that an angle β can be defined between the target substrate 109 and the composite structure 106. The angle β can range from about 0 degree to about 90 degrees. 'Vertically' implies that the target substrate 109 is vertical to the composite structure 106 and the angle β is 90 degrees. In another embodiment, the target substrate 109 is inserted into the cleaning solution 106 and substantially parallel to the composite structure 106 in the cleaning solution 106, and the angle β is 0 degrees.

In the step S52, the target substrate 109 is lift slowly. During the process of lifting the target substrate 109, a surface of the target substrate 109 is in contact with and adhere to the two-dimensional layer 102 and the composite structure 106 is picked up from the cleaning solution, and the two-dimensional layer 102 is sandwiched between the carbon nanotube composite film 103 and the target substrate 109.

After being picked up, the target substrate 109 and the composite structure 106 can be further dried. Thereby, the two-dimensional layer 102 can adhere to the target substrate 109 tightly.

In the present disclosure, the composite structure 106 comprising the two-dimensional nanomaterial layer 102 and the carbon nanotube composite film 103 is picked up from the cleaning solution 108 with the target substrate 109, and then transferred on a surface of the target substrate 109. Thereby, wrinkles and cracks on the surface of the two-dimensional nanomaterial layer 102 can be reduced, and a bonding force between the two-dimensional nanomaterial 102 and the target substrate 109 can be enhanced.

The carbon nanotube composite film 103 is transparent, so the two-dimensional nanomaterial layer 102 can be observed through the carbon nanotube composite film 103 under a stereo microscope. The target substrate 109 can be precisely aligned with the two-dimensional nanomaterial layer 102 of the composite structure 106 in the cleaning solution 108 in advance, and then the composite structure 106 is picked up from the cleaning solution 108 with the target substrate 103. The two-dimensional nanomaterial layer 102 can be transferred on a specific location of the target substrate 109 with precision. Thereby a site-directed transfer of the two-dimensional nanomaterial layer 102 can be realized.

In the step S6, the carbon nanotube composite film 103 is removed from the composite structure 106.

The two adjacent carbon nanotubes of the carbon nanotube film structure 104 are fixed together by the nanomaterial layer 105, so the carbon nanotube composite film 103 is a stable integral structure. Therefore, the carbon nanotube composite film 103 can be directly torn off by clamping a side of the carbon nanotube composite film 103 with a tool such as a pair of tweezers. The carbon nanotube composite film 103 can be completely removed, leaving the two-dimensional nanomaterial layer 102 on the surface of the target substrate 109. The two-dimensional nanomaterial layer 102 sustains no damages, and no residue is left on the surface of the two-dimensional nanomaterial layer 102.

Referring to FIG. 5(b), under the stereo microscope, the carbon nanotube composite film 103 can be completely torn off by clamping a side of the carbon nanotube composite film 103.

Figure 7:
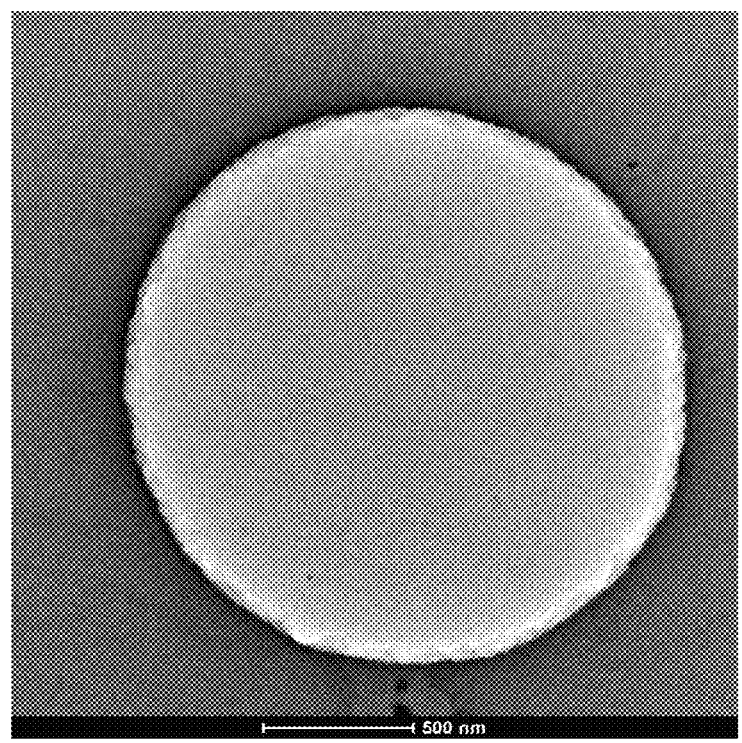
FIG. 7 shows a Transmission Electron Microscope image of a single-layer graphene after transfer according to one embodiment.

FIG. 7 shows a Transmission Electron Microscope (TEM) image of the graphene transferred on the surface of the target substrate. Referring to FIG. 7, the single-layer graphene has no observable defect, and no residue on the surface of the single-layer graphene can be seen on the TEM image.

Figure 8:
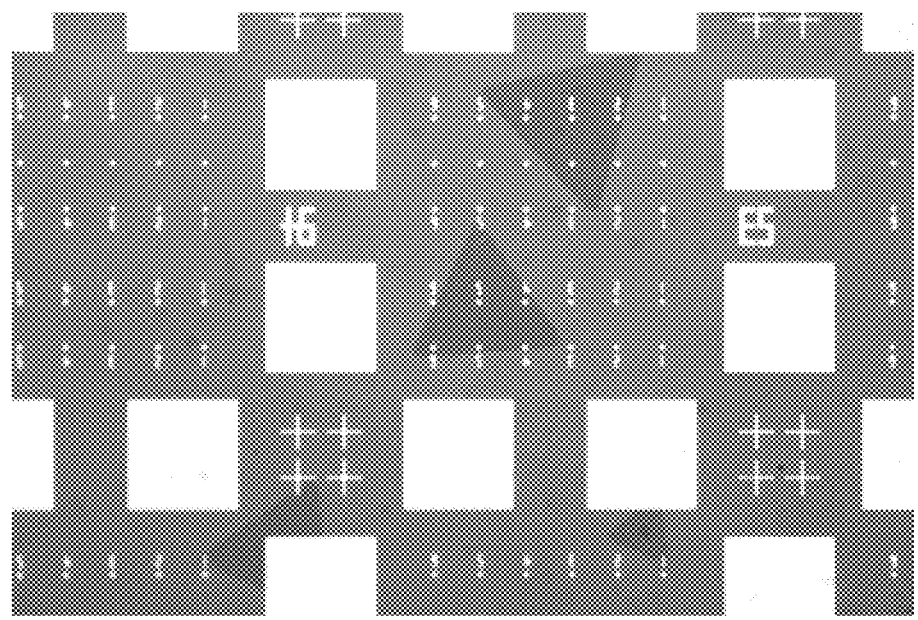
FIG. 8 shows an Optical Microscope image of a molybdenum sulfide after transfer according to another embodiment.

FIG. 8 shows an Optical Microscope image of the single-layer molybdenum sulfide transferred on the surface of the target substrate. The single-layer molybdenum sulfide has a triangle shape. As shown in FIG. 8, the shape of the single-layer molybdenum sulfide is unchanged after the transfer, and the single-layer molybdenum sulfide sustains no observable damages.

The method for transferring two-dimensional nanomaterials with a carbon nanotube composite film provided by the present disclosure comprises the following characteristics: Firstly, no residual organic binders is left on the surface of the two-dimensional nanomaterials of using the carbon nanotube film structure as the transfer medium compared with the method using PMMA or the thermal release tape; Secondly, less wrinkles and cracks, lower breakage rate, and higher integrity of the two-dimensional nanomaterials can be obtained using the carbon nanotube film structure as the transfer medium compared with the method without a transfer medium; Thirdly, the carbon nanotube composite film is light transmitting and transparent, and the two-dimensional nanomaterials can be observed through the carbon nanotube film. Therefore the two-dimensional nanomaterials can be transferred on a specific location of the surface of the target substrate with precision under a stereo microscope; Fourthly, due to the flexibility of carbon nanotube film, two-dimensional nanomaterials an be transferred on a curved surface of a substrate with the carbon nanotube film structure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for transferring two-dimensional nanomaterials comprising:
   (S1) providing a first substrate with a two-dimensional nanomaterial layer on a surface of the first substrate and a carbon nanotube composite film comprising a carbon nanotube film structure and a nanomaterial layer stacked with each other;
   (S2) covering the two-dimensional nanomaterial layer with the carbon nanotube composite film, wherein the carbon nanotube film structure of the carbon nanotube composite film is in contact with the two-dimensional nanomaterial layer;
   (S3) obtaining a composite structure comprising the two-dimensional nanomaterial layer and the carbon nanotube composite film by removing the first substrate with a corrosion solution;
   (S4) cleaning the composite structure by placing the composite structure on a surface of a cleaning solution;
   (S5) picking up the composite structure from the cleaning solution with a target substrate by contacting the target substrate with the two-dimensional nanomaterial layer; and
   (S6) removing the carbon nanotube composite film from the composite structure.

2. The method of claim 1, wherein a material of the two-dimensional nanomaterial layer is a graphene, a boron nitride, or a molybdenum sulfide.

3. The method of claim 1, wherein the carbon nanotube composite film is porous and comprises micropores.

4. The method of claim 1, wherein the carbon nanotube composite film is a integrated structure.

5. The method of claim 1, wherein the carbon nanotube composite film is a free-standing structure.

6. The method of claim 1, wherein the nanomaterial layer is continuously formed on a surface of each carbon nanotube in the carbon nanotube film structure to form a continuous layer structure.

7. The method of claim 1, wherein the nanomaterial layer is formed at an intersection of adjacent carbon nanotubes in the carbon nanotube film structure.

8. The method of claim 1, wherein a thickness of the nanomaterial layer ranges from 10 nanometers to 100 nanometers.

9. The method of claim 1, wherein a material of the nanomaterial layer is inert metal, metal oxide, semiconductor oxide or nitride.

10. The method of claim 1, wherein the carbon nanotube film structure is a free-standing structure, and the carbon nanotube film structure comprises at least two carbon nanotube films stacked with each other.

11. The method of claim 10, wherein each of the carbon nanotube films comprises a plurality of carbon nanotubes joined end-to-end by van der Waals force therebetween and extending approximately along a same extending direction.

12. The method of claim 11, wherein the extending directions of the plurality of carbon nanotubes are substantially parallel to a surface of the carbon nanotube film.

13. The method of claim 11, wherein angles between the extending directions of the carbon nanotubes in adjacent carbon nanotube films range from about 0 degrees to 90 degrees ($0°\leq\alpha\leq90°$).

14. The method of claim 1, wherein the corrosion solution is an acid solution, an alkali solution, or a salt solution.

15. The method of claim 1, wherein the cleaning solution is an acid solution or an ultra-pure water.

16. The method of claim 1, wherein the step (S5) comprises: inserting the target substrate into the cleaning solution; and lifting the target substrate to pick up the composite structure.

17. The method of claim 16, wherein during the process of lifting the target substrate, a surface of the target substrate is in contact with and adheres to the two-dimensional nanomaterial layer.

18. The method of claim 1, wherein the step (S5) further comprises drying the target substrate and the composite film composite structure after picking up the composite structure with the target substrate.

19. The method of claim 1, wherein the step (S6) comprises: clamping a side of the carbon nanotube composite film with a pair of tweezers; and tearing off the carbon nanotube composite film from the composite structure with the pair of tweezers.

* * * * *